(12) United States Patent
Akahoshi

(10) Patent No.: US 8,139,454 B2
(45) Date of Patent: Mar. 20, 2012

(54) RECORDING AND REPRODUCING APPARATUS AND METHOD

(75) Inventor: Kenji Akahoshi, Yokohama (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/815,062

(22) Filed: Jun. 14, 2010

(65) Prior Publication Data

US 2011/0019514 A1    Jan. 27, 2011

(30) Foreign Application Priority Data

Jul. 24, 2009 (JP) ................................. 2009-172669

(51) Int. Cl.
*G11B 7/00* (2006.01)

(52) U.S. Cl. .................. 369/47.5; 369/47.53; 369/47.15; 369/53.2; 369/59.1

(58) Field of Classification Search .................. None
See application file for complete search history.

(56) References Cited

U.S. PATENT DOCUMENTS

2007/0263504 A1* 11/2007 Park ........................... 369/47.14

FOREIGN PATENT DOCUMENTS

JP         2008-021408 A      1/2008

OTHER PUBLICATIONS

*DVD-RAM Gijutsu* (*Technology*) Torikeppusu Planning Department, pp. 28-33 (Nov. 27, 2000).

* cited by examiner

*Primary Examiner* — Muhammad N Edun

(74) *Attorney, Agent, or Firm* — Kilpatrick Townsend & Stockton LLP

(57) ABSTRACT

A Spare Area kept unused on a disk is available for use other than spare processing, or Defect Management process, and compatibility of the disk is at least secured between different recording apparatuses. This is implemented by recording a SWP_PAC cluster defined as a new item and by recording address information of used addresses in a PAC or TDDS area.

15 Claims, 7 Drawing Sheets

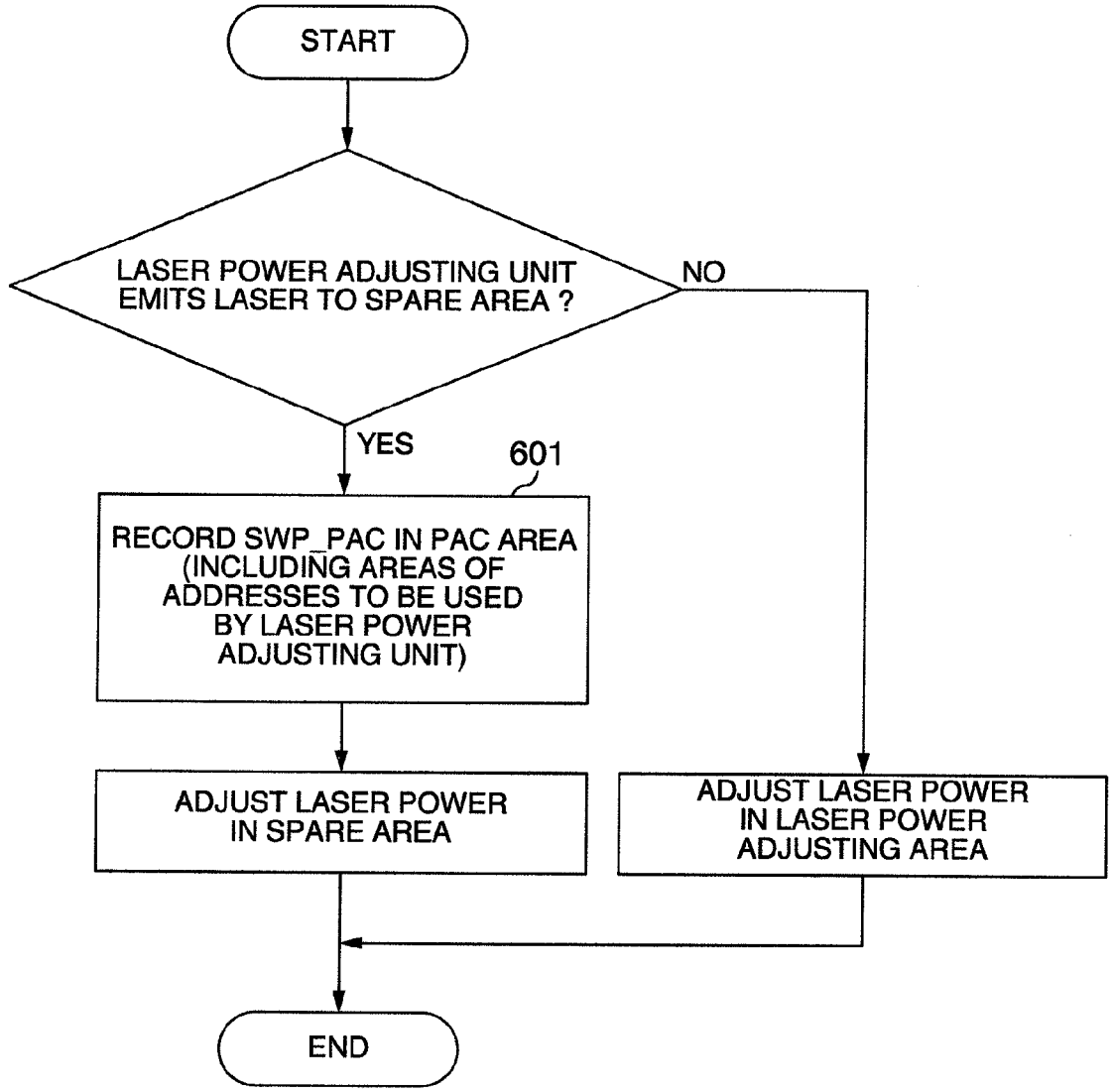

| Data Frame | Byte position | Contents |
|---|---|---|
| 0 | 0~2 | PAC_ID |
| 0 | 3 | PAC format |
| 0 | 4 | PAC Update Count |
| 0 | 8~11 | Unknown PAC Rules |
| 0 | 12 | Entire Disc Flags |
| 0 | 13, 14 | reserved |
| 0 | 15 | Number of Segments |
| 0 | 16~23 | Segment0 |
| 0 | 24~31 | Segment1 |
| 0 | 32~263 | ... |
| 0 | 264~271 | Segment31 |
| 0 | 272~383 | reserved |
| 0 | 384 | PAC specific information |
| 1 | 0~2047 | PAC specific information |
| ... | ... | ... |
| 31 | 0~2047 | PAC specific information |

703

| User Area Information | 01h | OPC Area |
| | 02h | TDMA Area |
| | ... | ... |

702

| Area | | Byte | Bits | Control type | SWP_PAC |
|---|---|---|---|---|---|
| — | | 8 | b31~b24 | reserved | 00 00 00 00 |
| INFO 2 | Reserved8 | 9 | b23 | write | 1 |
| | | | b22 | read | 0 |
| | Reserved7 | | b21 | write | 1 |
| | | | b20 | read | 0 |
| | Reserved6 | | b19 | write | 1 |
| | | | b18 | read | 0 |
| | Reserved5 | | b17 | write | 1 |
| | | | b16 | read | 0 |
| INFO 1 | Drive Area | 10 | b15 | write | 0 |
| | | | b14 | read | 0 |
| INFO 1 | Reserved3 | | b13 | write | 1 |
| | | | b12 | read | 0 |
| | Reserved2 | | b11 | write | 1 |
| | | | b10 | read | 0 |
| | Reserved1 | | b9 | write | 1 |
| | | | b8 | read | 0 |
| INFO 1,2,3,4 | DMA Zone NOT APPLICABLE TO DDS | 11 | b7 | write | 0 or 1 |
| Data Zones | Spare Areas | | b6 | write | 1 |
| INFO 1,2,3,4 | Control Data Zones | | b5 | write | 0 |
| | | | b4 | read | 0 |
| Data Zones | User Data Area / Segments | | b3 | write | 0 |
| | | | b2 | read | 0 |
| INFO 1 & 2 | PAC Cluster | | b1 | write | 0 |
| | | | b0 | read | 0 |

RECORDING AND REPRODUCING APPARATUS AND METHOD

INCORPORATION BY REFERENCE

The present application claims priority from Japanese application JP2009-172669 filed on Jul. 24, 2009, the content of which is hereby incorporated by reference into this application.

BACKGROUND OF THE INVENTION

The present invention relates to an apparatus for and a method of recording and reproducing information on a medium, and in particular, to a physical access restriction rule for a medium in an apparatus to record and to reproduce information on the medium by use of a laser power adjusting area, a Spare Area, and a medium managing area of the medium.

SUMMARY OF THE INVENTION

In some recording and reproducing apparatuses today, a semiconductor laser is employed to emit a laser beam onto an optical disk recording medium, for example, a CD recordable/Rewritable (CD-R/RW), a DVD±Recordable/Rerecordable (DVD±R/RW), DVD-Re-Writable (DVD-RAM), or a Blu-ray Disc to achieve data recording and reproducing operations.

In such optical disk, when the physical format version thereof is updated, there likely occurs a problem of reproducing and/or recording compatibility between lower and higher physical format versions. To solve the problem for the Blu-ray disk, there has been proposed a Physical Access Control (PAC) cluster which makes it possible to provide physical access restrictions. JP-A-2008-21408 describes this technique.

In presence of a defect on the medium due to, for example, a flaw caused by damage on the medium, a fingerprint, dirt, or deterioration of a recording film, even if data is recorded in the defective area of the medium, it is likely that the data cannot be read from the medium. To elongate life of the disk by skipping the defect on the disk surface, there exists a defect managing method (spare processing, or Defect Management process, method) called "linear replacement". In this method, data is not recorded in the defective area, but is recorded in a Spare Area (substitution recording area) disposed in the pertinent optical disk. Also, an optical disk includes an exclusive adjusting area to emit a laser beam with optimal laser power onto the disk surface. Reference is to be made to "DVD-RAM Gijutsu (Technology)" edited by Torikeppusu Planning Department and published from Torikeppusu in 2000.

Ordinarily, the Spare Area is reserved by allocating part of a User Data Area. Hence, for the user, the data recording area (capacity) is reduced due to the area (capacity) allocated or expanded for the Spare Area. Therefore, in a situation in which a flaw caused by damage on the medium, a fingerprint, dirt, or deterioration of a recording film rarely takes place and there hence occur few recording errors during the data recording operation, the initial Spare Area is rarely used. Additionally, the Spare Area once reserved through the formatting operation cannot be changed. Description will now be given of the operation according to an example of the Blu-ray disc. When a Spare Area is reserved on a Blu-ray Disc-Recordable (BD-R) of write-once type through a formatting operation, it is not possible to change the allocation ratio between the Spare Area and the User Data Area. For a Blu-ray Disc-Rewritable (BD-RE) of rewritable type, once the Spare Area is reserved, it is possible, only after the disk is formatted again, to change the allocation ratio between the Spare Area and the User Data Area. Hence, when the spare processing, or Defect Management process, is rarely executed, the recording operation is finished with these areas kept unused.

During the formatting operation, the laser power adjusting area cannot be allocated. The laser power adjusting area is to be allocated according to rules prescribed by the physical standards of the disk.

Therefore, when the laser power adjusting area is insufficient, the laser power cannot be adjusted. This leads to a problem of difficulty in the recording of data with optimal recording quality. However, there does not exist a method of expanding the laser power adjusting area. To overcome the difficulty, it will be possible to employ the unused laser power adjusting area as an area to adjust the laser power. However, this is not possible due to a fear of a problem associated with compatibility.

It is therefore an object of the present invention to secure at least compatibility between different recording apparatuses while employing the unused laser power adjusting area as the laser power adjusting area.

The object is achieved according to, for example, the invention described in the claims of the present specification.

According to the present invention, it is possible to employ the unused Spare Area as the laser power adjusting area.

BRIEF DESCRIPTION OF THE DRAWINGS

FIG. 6 is a flowchart showing an SWP_PAC recording operation in the second embodiment; and FIG. 7 is a diagram showing structure of PAC clusters written in a PAC area.

DESCRIPTION OF THE EMBODIMENTS

Figure 1:
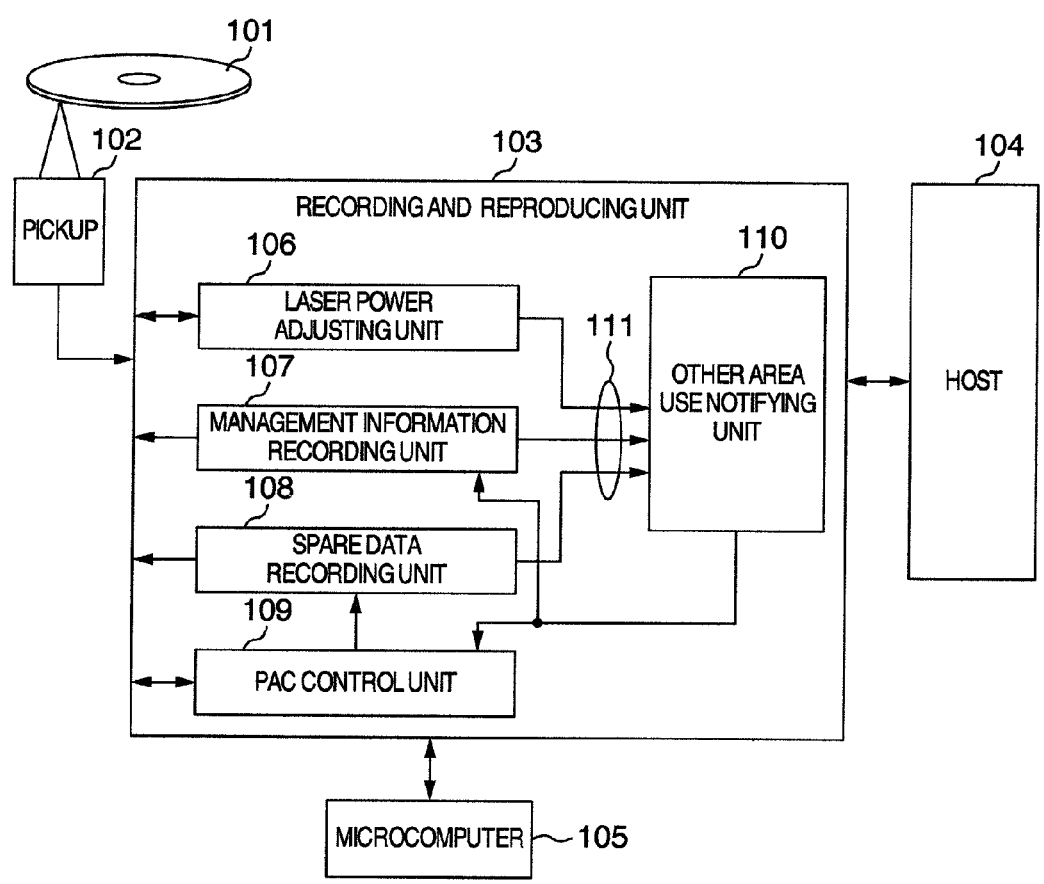
FIG. 1 is a block diagram showing a configuration of a recording and reproducing apparatus in an embodiment according to the present invention.

Description will now be given of an embodiment of the present invention by referring to the drawings. In the recording and reproducing apparatus of the embodiment, the unused laser power adjusting area can be employed as the laser power adjusting area. Also, by securing at least compatibility between different recording apparatuses, it is possible to eliminate any danger of, for example, data destruction.

First Embodiment

Description will now be given of the first embodiment according to the present invention.

FIG. 1 shows a configuration of the recording and reproducing apparatus according to the embodiment of the present invention in a block diagram. Referring to the block diagram, the structure of the recording and reproducing apparatus will be described.

This recording and reproducing apparatus includes an optical disk 101 which is capable of recording and reproducing data and which includes a User Data Area, a disk managing information recording area, a laser power adjusting area, a Spare Area, and a Physical Access Control (PAC) area on the disk, a pickup 102 to read a record signal from the optical disk 101, and a data recording and reproducing unit 103. Although not shown in FIG. 1, the data recording and reproducing unit 103 includes units required to deliver data read from the pickup 102 to a host 104 and units required to record data from the host 104 onto the disk 101, for example, a servo control unit to control the pickup 102, a unit to modulate and to demodulate data, a unit to correct errors, a temporary storage unit to temporarily store data, and a temporary storage control unit to control the temporary storage unit. Reference numeral 105 indicates a microcomputer to control the data recording and reproducing unit 103.

The recording and reproducing apparatus further includes a laser power adjusting unit 106 to adjust emission power of the laser to be emitted onto the optical disk 101 to obtain optimal recording quality, a managing information recording unit 107 to record managing information of data recorded on the optical disk 101, a spare data recording unit 108 to record data in a Spare Area when the data cannot be recorded in a User Data Area of the optical disk 101 for some reason, and a PAC control unit 109 to record and to reproduce data in a PAC area of the optical disk 101 according to a PAC format prescribed in the standards. Reference numeral 110 indicates another area use notifying unit. When any one of the units 106 to 108 records data in an area other than an area inherently allocated to the unit to record data therein, the other area use notifying unit 110 beforehand receives from the unit a notification signal 111 including address information for the recording operation and then notifies the information to the PAC control unit 109 according to the information.

Figure 2:
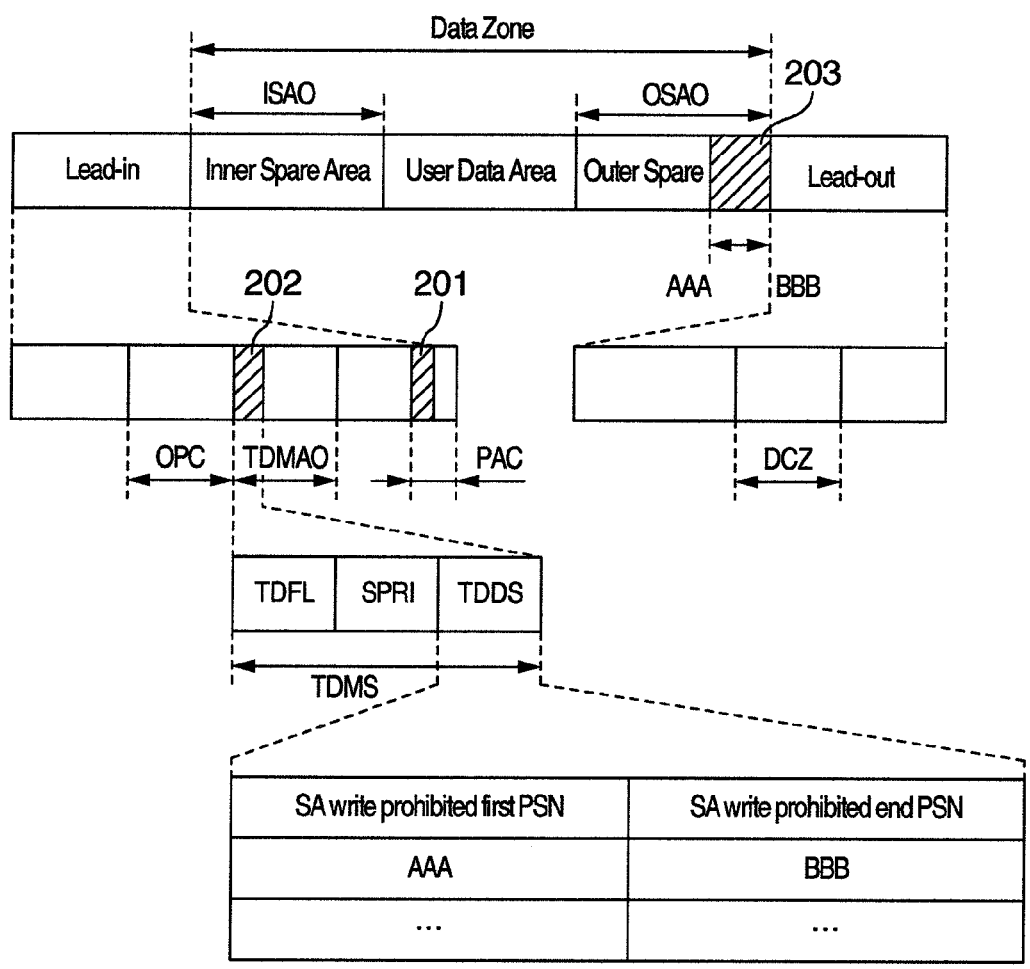
FIG. 2 is a diagram showing structure of a Blu-ray disc in a first embodiment.

FIG. 2 shows a general configuration of the BD-R. The BD-R mainly includes a Lead-in Area, a Data Zone, and a Lead-out Area. The Data Zone includes an Inner Spare Area 0 (ISA0) as an inner Spare Area, a user data area, and an Outer Spare Area 0 (OSA0) as an outer Spare Area.

The Lead-in, ISA0, and OSA0 areas respectively include Temporary Disk Management Areas (TDMA) to record management information of record states, i.e., TDMA0, TDMA1, and TDMA2. For easy understanding, TDMA1 and TDMA2 respectively of ISA0 and OSA0 are not shown in this example. Each TDMA includes a plurality of Temporary Disc Management Structures (TDMS). TDMS is the unit of update (recording) operation. TDMS includes a Temporary Defect List (TDFL), Sequential Recording Rang Information (SRRI), and Temporary Disc Definition Structure (TDDS). TDFL is employed as a list to manage a spare location for a defective location on the disk. SRRI includes management information called a Sequential Recording Range (SRR), which is a record area associated with the disk configuration. TDDS includes TDFL allocating information and disk managing information such as capacity of ISA0 and OSA0. An Optimum Power Control (OPC) area and a Drive Calibration Zone (DCZ) are disposed to adjust laser power for optimal recording quality. A PAC area is arranged to record a PAC cluster when it is desired to impose a physical access restriction onto an associated disk drive. The recording and reproducing apparatus accesses the PAC area each time a disk is installed in the apparatus.

Referring to FIGS. 1 to 4, description will be given of actual operation of the recording and reproducing apparatus.

In the recording and reproducing apparatus of FIG. 1, when a disk of BD-R is installed for data recording operation, the laser power adjusting unit 106 executes laser power adjusting processing before the recording operation according to necessity. The laser power adjusting is conducted in the OPC or DCZ area of FIG. 2. For a rewritable medium such as BD-RE, the OPC area is reusable by erasing data written therein. However, for a write-once type medium such as BD-R, when the beforehand allocated area is used up, the processing for OPC is not possible and the data recording operation cannot be conducted depending on cases. Also, since the ISA and OSA areas are reserved through the formatting operation, the allocation ratio between the Spare Area and the User Data Area cannot be changed during the data recording operation. Hence, when the recording operation finishes without any recording error, the initially reserved Spare Area is not used at all. Accordingly, it will be possible to effectively employ the unused Spare Area.

Assume in FIG. 2 that the OPC and DCZ areas are used up and the OPC cannot be carried out. In this situation, if the unused OSA is employed as the OPC area, a problem takes place when a second recording and reproducing apparatus desires to record data on the disk for the following reason. In an ordinary recording method, ISA and OSA are employed only to record spare data, and the areas employed to record the spare data are registered to a Defect List (DFL) in TDFL. Hence, in a data recording operation by the second recording and reproducing apparatus, by reading the defect list, the spare data recording unit can additionally record data in the recorded areas of ISA and OSA without conducting the overwriting operation. However, when the laser power is adjusted in ISA and OSA, the recorded areas cannot be registered to DFL. Accordingly, the spare data recording unit regards the areas as unrecorded areas and then overwrites data therein. In short, it is likely that the spare data is not appropriately recorded, and compatibility is not retained for the existing recording and reproducing apparatuses.

Figure 3:
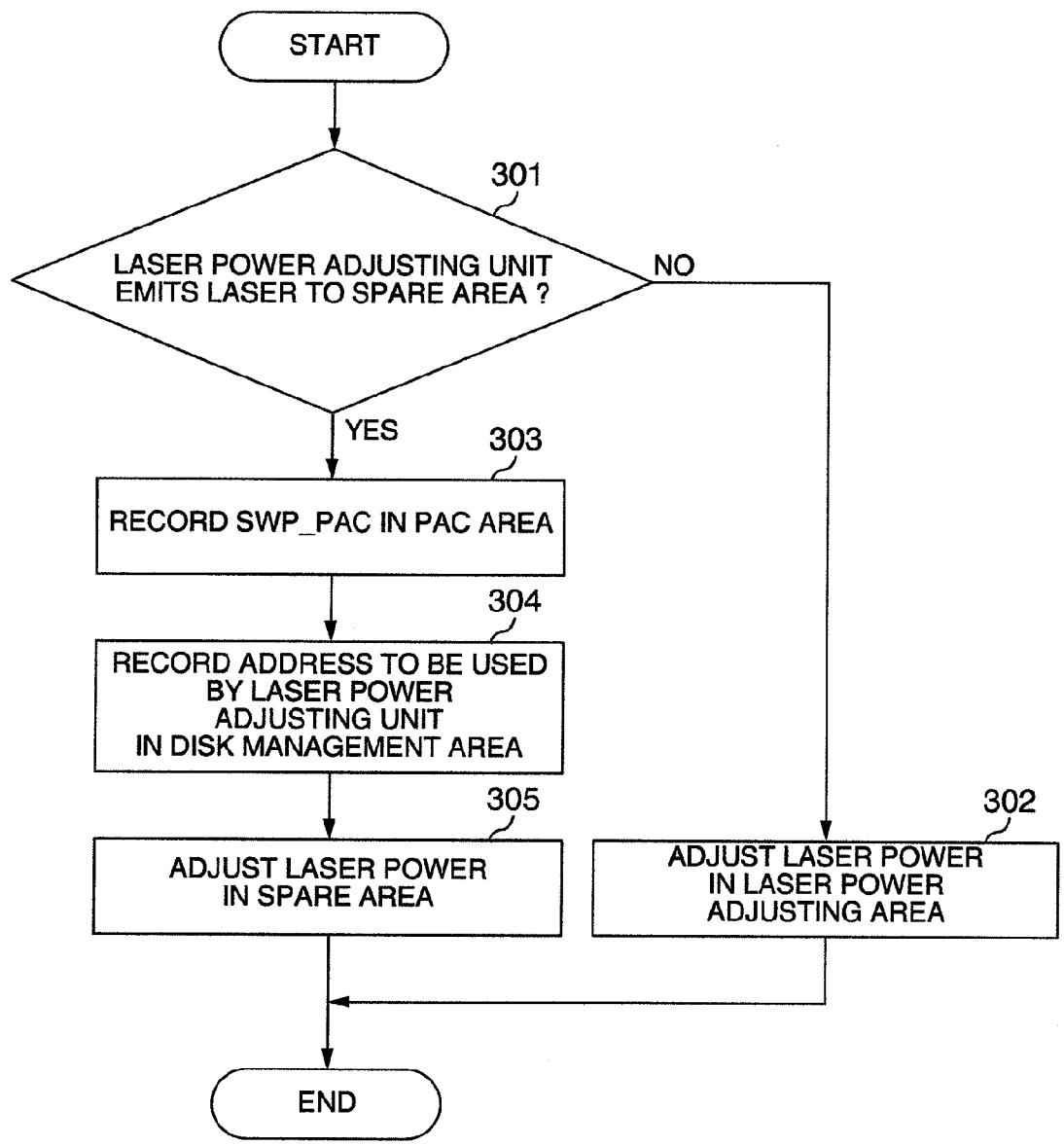
FIG. 3 is a flowchart showing a Spare Area Write Protect (SWP) PAC (SWP_PAC) recording operation in the first embodiment.

Referring now to FIGS. 2 and 3, description will be given of a flowchart of processing to solve the problem. In step 301 of FIG. 3, the laser power adjusting unit makes a check to determine whether or not laser power adjustment is to be conducted in the Spare Area. If the laser power adjustment is not to be conducted, control goes to step 302 to ordinarily carry out the laser power adjustment in the laser power adjusting area. Otherwise, control goes to step 303 to record a Spare Area Write Protect (PAC; SWP_PAC) cluster in the PAC area. This step corresponds to the field 201 shown in FIG. 2. In this connection, the SWP_PAC cluster is defined as a new item according to the present invention. FIG. 7 shows an example of its format definition. Also, "SWP_PAC" is only an example of its name. Any other name may be used. In step 304, an address range of the Spare Area to be used by the laser power adjusting unit is recorded in the disk management information recording area. This step corresponds to the field 202 of FIG. 2. For example, when two address information pieces, i.e., SA write prohibited first PSN and SA write prohibited last PSN are provided for an information piece of TDDS, the first address of the area to be used is registered as SA write prohibited first PSN and the last address of the area to be used is registered as SA write prohibited last PSN. If it is desired to use an area ranging from address AAA to address BBB as the OPC area indicated by numeral 203 in FIG. 2, AAA and BBB are registered as the first and last addresses, respectively. The range of addresses may be an address range to be used in this operation or may be a wider address range including a margin for operations to be conducted after this point. Also, the address range may be selected to provide several free clusters in the boundary with respect to the Spare Area. In step 305, the laser power adjustment is conducted in the Spare Area.

This step corresponds to the field 203 of FIG. 2. Although the recording operation is carried out through the fields 201, 202, and 203, the operation sequence may be changed. However, assume that the recording operation is suspended after the field 203 is recorded before the fields 201 and 202 due to interruption of power. In this situation, there is disadvantageously produced a disk which does not include the fields 201 and 202. To avoid this disadvantageous situation, the fields 201 and 202 are recorded before the field 203 in the present embodiment.

Figure 4:
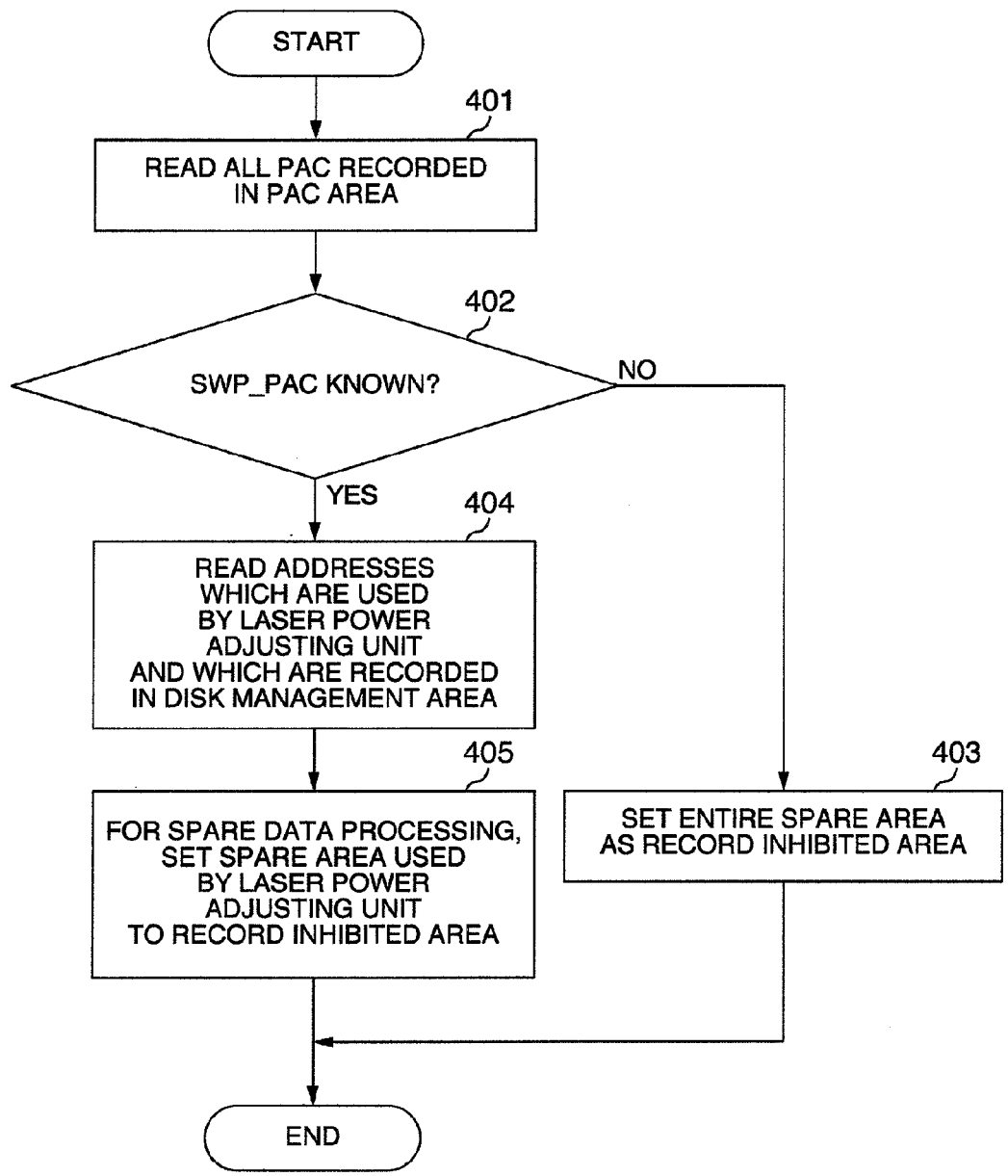
FIG. 4 is a flowchart showing an SWP_PAC reproducing operation.

Referring now to FIG. 4, description will be given of data reproduction of the disk by the recording and reproducing apparatus. In step 401, the PAC clusters recorded in the PAC area are read from the disk irrespectively of whether the data format of the clusters is the PAC format which can be recognized by the recording and reproducing apparatus. In step 402, a check is made to determine whether or not the format of SWP_PAC is recognizable, that is, whether or not the apparatus knows the definition of the format of SWP_PAC and the method of handling the data.

Referring now to FIG. 7, description will be given of the operation to determine the condition described above.

FIG. 7 shows an example of structure of the PAC cluster written in the PAC area.

In FIG. 7, the PAC structure 701 includes a header and an area in which inherent information of the PAC is written. The header includes items ranging from a PAC_ID to segment 31. PAC_ID indicates an identification code. For example, for SWP_PAC of the present invention, PAC_ID is written as 53h, 57h, and 50h to indicate that the PAC is SWP_PAC. The PAC format indicates the version of the PAC, and the PAC update count indicates the number of updates of the PAC cluster. The unknown PAC rules field is a definition of rules to be observed by the recording and reproducing apparatus which cannot recognize the SWP_PAC definition. The unknown PAC rules will be described later by referring to information indicated by numeral 702. The unknown PAC entire_disc_flags field is employed whether or not re-initialization is allowed if the recording and reproducing apparatus cannot recognize the PAC recorded on the disk. The number of segments field indicates the number of segments in the current PAC. Segments 0 to 31 are disposed to indicate the first address and the last address of successive clusters. The PAC specific information is capable of providing a definition inherent to the PAC. Information 703 shows an example of the setting for SWP_PAC. In the information 703, the used area information field indicates the purpose for which an associated spare area is employed. If the spare are is used as an OPC area, 01h is set. By checking the used area information, the recording and reproducing apparatus is able to recognize the purpose of the use of the spare area.

Referring now to the information 702, description will be given of the unknown PAC rules. The information 702 corresponds to bytes 8 to 11 of the information 701 and is an example of the definition of the unknown PAC rules for SWP_PAC of the present invention. If it is not possible to recognize the PAC definition of the PAC_ID, namely, the SWP_PAC, the recording and reproducing apparatus may impose a physical access restriction based on the unknown PAC rules. According to the unknown PAC rules, the disk is subdivided into predetermined areas to prescribe physical read/write access control for each of the areas. A read/write access restriction is assigned to each area and is indicated in the bit unit by use of associated bits. In the definition of control type write, 0 indicates "write allowed" and 1 indicates "write inhibited". In the definition of control type read, 0 indicates "read allowed" and 1 indicates "read inhibited". For example, if the SWP_PAC definition is designated by the information 702, "write=1" is set to the spare areas field of the data zones field. Hence, any data writing operation in the spare areas is inhibited. Therefore, if it is not possible to recognize the format of SWP_PAC, the recording and reproducing apparatus inhibits in step 403 the data recording operation in the Spare Area based on the unknown PAC rules information in SWP_PAC. If the format of SWP_PAC is known, the recording and reproducing apparatus reads the addresses recorded in step 304. The addresses indicate an area in which the laser power adjusting unit has recorded data or will record data later. Hence, the spare processing, or Defect Management process, is executed in step 405 by regarding these addresses as recording inhibited addresses. As a result, for a recording and reproducing apparatus which cannot recognize the format of the SWP_PAC cluster, the Spare Area is set as a recording inhibited area. This inhibits the data overwriting operation in the area. Hence, the disk is kept reproducible. For a recording and reproducing apparatus which can recognize the SWP_PAC cluster format, by obtaining the address information from the management information recording area, it is possible to execute the spare processing, or Defect Management process, as before without conducting the data overwriting operation in the recorded area.

To enforce the inhibition of the data recording operation on the disk, it is also possible to set "write=1" for the control type of the DMA zones. That is, by inhibiting the update of the management information, it is possible to securely prevent the existing recording and reproducing apparatus from conducting an erroneous recording operation.

Second Embodiment

Figure 5:
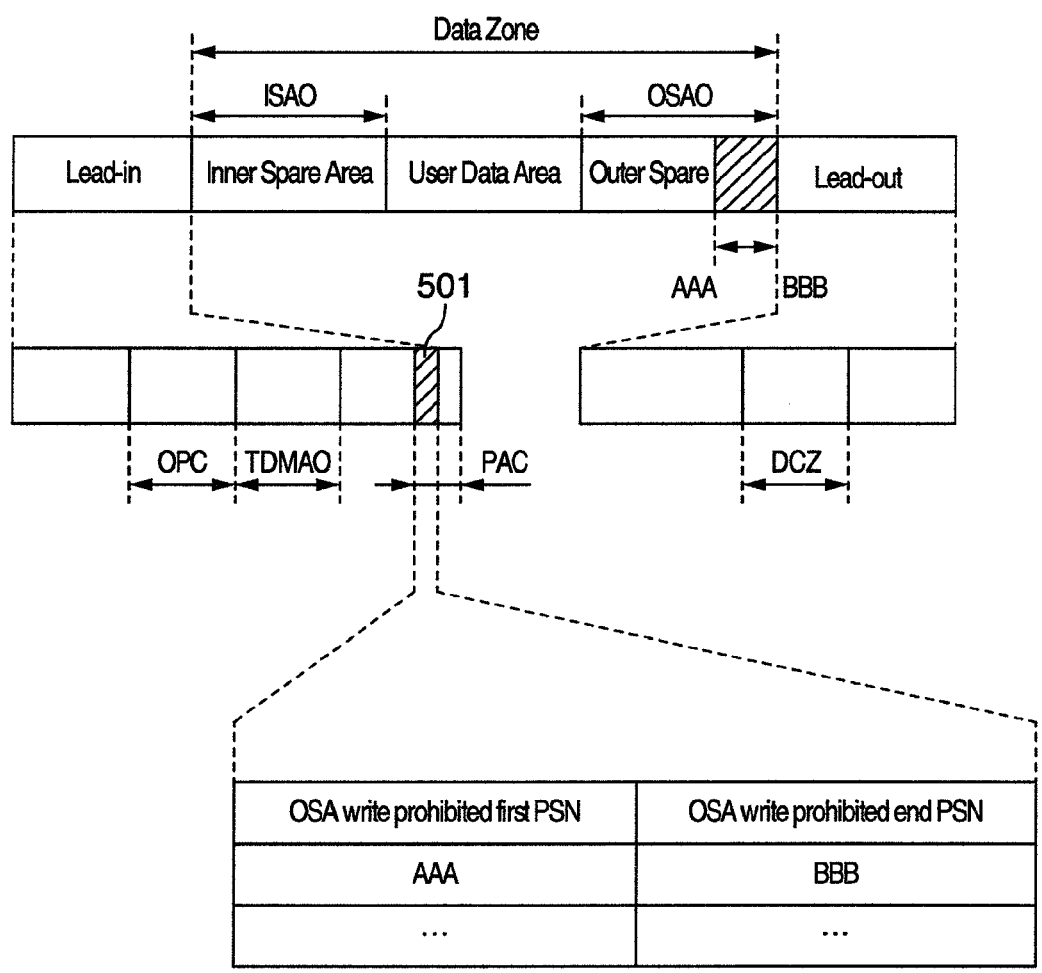
FIG. 5 is a diagram showing structure of a Blu-ray disc in a second embodiment.

Referring now to FIGS. 5 and 6, description will be given of the second embodiment of the present invention. The second embodiment is substantially equal in structure to the first embodiment, but differs from the first embodiment in that two address information pieces, i.e., the SA write prohibited first PSN and the SA write prohibited last PSN to be recorded in the TDDS in the first embodiment are recorded in an PAC area 501 shown in FIG. 5. Hence, also in the recording flowchart, the address information which is to be used by the laser power adjusting unit and which is recorded in the TDDS in step 304 of FIG. 3 in the first embodiment is simultaneously recorded along with SWP_PAC in step 601 of FIG. 6. In the data reading operation, although not shown, the address information obtained from the TDDS in step 404 of FIG. 4 is obtained from the PAC in the second embodiment. Therefore, even if the address information is recorded in the PAC, the second embodiment leads to an advantage substantially equal to the advantage of the first embodiment.

According to the embodiments, also in a situation in which even data other than spare data is recorded in the unused Spare Area, it is possible, by use of the SWP_PAC cluster defined as a new item, to record data on the recording medium without conducting the data overwriting operation.

Additionally, in the existing recording and reproducing apparatuses, it is possible to prevent an erroneous recording operation on the disk to thereby prevent destruction of data.

Although the spare area is one area in the embodiments, it is also possible that the area is divided into an inner spare area and an outer spare area to define the unknown PAC rules for each of the areas. As a result, it is possible to impose different access restrictions to the inner and output spare areas. For example, only the outer spare area is set to a recording inhibited area without imposing any recording restriction to the inner spare area. Assume that when the output spare area is used for an operation other than, for example, a spare data recording operation, the outer spare area is set as a recording inhibited area. In this situation, although the remaining outer spare area cannot be used for the data recording operation, the inner spare area is available. Hence, the spare processing, or Defect Management process, can be executed.

In the example of the embodiments, the spare area is used as the OPC area. However, it is also similarly possible to employ the spare area as a disk management information recording area and a user data area.

In the example of the embodiments, a write-once medium is employed. However, the difference between the write-once medium and the rewritable medium resides only in whether various data items are additionally written in a write-once fashion or are overwritten. The present invention is also applicable to the rewritable medium to obtain the similar advantage.

The similar advantage is obtainable for a single layer disk as well as a multilayer disk.

The present invention is not restricted by the optical disks described for the embodiments. The present invention is applicable to any recording medium which includes concepts of a Spare Area and a management information storing area, and the similar advantage is also obtainable.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording and reproducing apparatus for use with a medium comprising a User Data Area, a disk management information recording area, a laser power adjusting area, a Spare Area, and a Physical Area Control (PAC) area as a physical access control data recording area to record physical access control data, the apparatus comprising:
   management information recording unit for recording management information of a disk in the disk management information recording area;
   laser power adjusting unit for adjusting laser power in the laser power adjusting area;
   spare processing data recording unit for recording spare data in the Spare Area;
   PAC control unit for recording, in the PAC area, a PAC cluster including physical access control data; and
   other area use notifying unit for sending a notification to the PAC control unit when each of the areas is inherently allocated for recording operation for each of the units, the notification notifying the PAC control unit to emit laser at a recording emission level to an area other than the areas inherently allocated to the respective units, wherein
   the PAC control unit records, at reception of the notification from the other area use notifying unit, the PAC cluster in the PAC area, the PAC cluster including information indicating a purpose of use of the area other than the areas inherently allocated to the respective units.

2. The recording and reproducing apparatus according to claim 1, wherein the other area use notifying unit notifies information to the PAC control unit, the information indicating in which one of the areas each of the units conducts recording operation.

3. The recording and reproducing apparatus according to claim 1, wherein, the PAC cluster to be recorded by the PAC control unit differs in contents for each of the units notified from the other area use notifying unit.

4. The recording and reproducing apparatus according to claim 3, wherein, the PAC control unit records a Spare Area Write Protect PAC (SWP_PAC) cluster as a Spare Area use inhibited PAC cluster when it is notified from the other area use notifying unit to emit laser to the Spare Area at a recording emission level.

5. The recording and reproducing apparatus according to claim 4, wherein:
   the SWP_PAC cluster comprises a physical access control flag for each recording area of the medium; and
   a flag of the physical access control flag to inhibit a recording operation in the Spare Area is effective.

6. The recording and reproducing apparatus according to claim 5, wherein when the PAC control unit reads the SWP_PAC cluster recorded on the medium and cannot identify a type of the PAC of the SWP_PAC cluster, the recording operation in the Spare Area is inhibited on the basis of information of the physical access control flag.

7. The recording and reproducing apparatus according to claim 4, wherein the SWP_PAC cluster comprises data indicating which one of the units has recorded data in the Spare Area.

8. The recording and reproducing apparatus according to claim 4, wherein the management information recording unit records, in the management area, address information to identify a range of the Spare Area in which laser is to be emitted.

9. The recording and reproducing apparatus according to claim 8, wherein when the PAC control unit reads the SWP_PAC cluster recorded on the medium and can identify a type of the PAC of the SWP_PAC cluster, a recording operation in the Spare Area other than an area indicated by the address information is allowed.

10. The recording and reproducing apparatus according to claim 4, wherein the PAC control unit records, in the PAC area, the address information to identify a range of the Spare Area in which laser is to be emitted.

11. The recording and reproducing apparatus according to claim 10, wherein when the PAC control unit reads the SWP_PAC recorded on the medium and can identify a type of the PAC of the SWP_PAC, a recording operation in the Spare Area other than an area indicated by the address information is allowed.

12. A recording and reproducing method of conducting recording and reproducing operations for a medium comprising a User Data Area, a disk management information recording area, a laser power adjusting area, a Spare Area, and a Physical Area Control (PAC) area as a physical access control data recording area to record physical access control data, the apparatus comprising a method for use
   in a situation in which the respective areas are allocated as dedicated areas respectively for use of disk management, use of laser power adjustment, use of Defect Management process, and use of PAC cluster recording to record a PAC cluster including physical access control data in the PAC area, the method comprising the step of
   emitting laser at a recording emission level to an area other than the areas allocated to the respective areas for use other than the uses of the respective areas, and
   recording a PAC cluster in the PAC area, the PAC cluster including information indicating a purpose of use of the area other than the areas inherently allocated to the respective uses.

13. The recording and reproducing method according to claim 12, wherein if it is possible to recognize a definition of the PAC cluster inhibiting a recording operation in the area to be used, data is allowed to be written in a write-once fashion in the area or data is allowed to be overwritten in the area.

14. The recording and reproducing method according to claim 12, wherein if it is not possible to recognize a definition of the PAC cluster inhibiting a recording operation in the area to be used, data is inhibited from being written in a write-once fashion in the area or is inhibited from being overwritten in the area.

15. The recording and reproducing method according to claim 12, the method comprising the step of recording address information to identify a range in which laser is to be emitted, in the disk management information recording area or the physical access control data recording area.

* * * * *